United States Patent
Uenishi et al.

(10) Patent No.: US 10,590,221 B2
(45) Date of Patent: *Mar. 17, 2020

(54) MODIFIED DIENE BASED POLYMER

(71) Applicant: The Yokohama Rubber Co., Ltd., Tokyo (JP)

(72) Inventors: Kazuya Uenishi, Kanagawa (JP); Takahiro Okamatsu, Kanagawa (JP); Ryota Takahashi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,950

(22) Filed: Dec. 2, 2015

(65) Prior Publication Data

US 2016/0083498 A1 Mar. 24, 2016

Related U.S. Application Data

(63) Continuation of application No. 14/403,294, filed as application No. PCT/JP2013/064157 on May 22, 2013, now Pat. No. 9,228,064.

(30) Foreign Application Priority Data

May 24, 2012 (JP) ................................. 2012-118354

(51) Int. Cl.
| | | |
|---|---|---|
| *C08F 279/02* | (2006.01) | |
| *B60C 1/00* | (2006.01) | |
| *C08G 81/02* | (2006.01) | |

(52) U.S. Cl.
CPC .............. *C08F 279/02* (2013.01); *B60C 1/00* (2013.01); *C08G 81/02* (2013.01); *C08G 81/025* (2013.01); *Y02T 10/862* (2013.01)

(58) Field of Classification Search
CPC .... C08G 81/025; C08G 81/02; C08G 18/283; C08G 18/2835; B60C 1/00
USPC ........................................................ 525/130
See application file for complete search history.

(56) References Cited

U.S. PATENT DOCUMENTS

| | | |
|---|---|---|
| 3,134,745 A | 5/1964 | Dennis |
| 5,262,477 A | 11/1993 | Kasai |
| 5,336,722 A | 8/1994 | Faul |
| 5,385,459 A | 1/1995 | Graves |
| 5,703,167 A | 12/1997 | Ohmae |
| 5,720,969 A | 2/1998 | Gentile |
| 6,518,369 B2 | 2/2003 | Scholl |
| 6,559,263 B1 | 5/2003 | Benecke |
| 2002/0045699 A1 | 4/2002 | Scholl et al. |
| 2008/0318005 A1 | 12/2008 | Millward |
| 2009/0036550 A1 | 2/2009 | Bouillo |
| 2010/0190894 A1 | 7/2010 | Chaverot et al. |
| 2010/0197835 A1 | 8/2010 | Chaverot et al. |
| 2010/0252156 A1 | 10/2010 | Robert et al. |
| 2013/0165589 A1 | 6/2013 | Mruk et al. |
| 2013/0345367 A1 | 12/2013 | Stojcevic |
| 2018/0118856 A1* | 5/2018 | Kato ....................... C08C 19/22 |

FOREIGN PATENT DOCUMENTS

| | | |
|---|---|---|
| CN | 10236914 A | 2/2012 |
| DE | 1495210 | 11/1964 |
| JP | 2001-206906 A | 7/2001 |
| JP | 2002-088193 | 3/2002 |
| JP | 2007-217653 | 8/2007 |
| JP | 2010-531375 A | 9/2010 |
| JP | 2010-534262 A | 11/2010 |
| JP | 2010-534263 A | 11/2010 |
| JP | 2012-158738 | 8/2012 |
| JP | 2013-136748 A | 7/2013 |

OTHER PUBLICATIONS

Machine Translation of CN102336914A.*
"Polybutadiene". Wikipedia article. Evidentiary reference. https://en.wikipedia.org/wiki/Polybutadiene. (Year: 2018).*
International Notification of Transmittal and Preliminary Report on Patentability from corresponding PCT application No. PCT/JP2013/064157 dated Dec. 4, 2014 (6 pgs).
International Search Report from corresponding PCT application No. PCT/JP2013/064157 dated Sep. 17, 2013 (4 pgs).

* cited by examiner

*Primary Examiner* — Michael M Dollinger
(74) *Attorney, Agent, or Firm* — Brinks Gilson & Lione

(57) ABSTRACT

Provided is a modified diene based polymer in which a diene based polymer is graft modified with a polyether having a mercapto group attached via diurethane bonding. Formation of diurethane bonding is performed by allowing sequential reactions of two species of hydroxyl group-containing compounds with an diisocyanate compound. By adding the modified diene based polymer to a silica-containing rubber composition for automobile pneumatic tires, the dispersibility of silica compounded in the rubber composition can be improved, and a property inherent in silica which simultaneously allows a reduction of rolling resistance and a stability on wet road surfaces can be sufficiently effected.

4 Claims, No Drawings

MODIFIED DIENE BASED POLYMER

RELATED APPLICATION

This application is a continuation application based on and claiming priority under 35 U.S.C. § 120 to U.S. patent application Ser. No. 14/403,294, filed Nov. 24, 2014, which was a 35 U.S.C. § 371 national phase filing of International Patent Application No. PCT/JP2013/064157, filed May 22, 2013, through which and to which priority is claimed under 35 U.S.C. § 119 to Japanese Patent Application No. 2012-118354, filed May 24, 2012, the complete disclosures of each of which is hereby expressly incorporated by reference.

TECHNICAL FIELD

The present invention relates to a modified diene based polymer. More specifically, the present invention relates to a modified diene based polymer which can be effectively used as a component of a rubber composition for automobile pneumatic tires and the like.

BACKGROUND ART

As various properties required for automobile pneumatic tires, a reduction of rolling resistance, a stability on wet road surfaces and the like are demanded. In a method of allowing simultaneous achievement of the reduction of rolling resistance and the stability on wet road surfaces as described above, silica is compounded as a reinforcing filler in a rubber composition for tires.

However, when silica is compounded into a rubber composition for tires, silica is poorly dispersed into such composition. Therefore, even if a large amount of silica is added, effects thereof may not be fully achieved. This may pose a problem.

Patent Document 1 describes a rubber composition for treads comprising silica and polyethylene glycol compounded in a diene based rubber, in which 10 mass % or more of the diene based rubber is replaced with a styrene/isoprene/butadiene terpolymer. Patent Document 1 also describes that this rubber composition balances wet performance with rolling resistance at a high level, and further describes that the composition shows good processability when kneading.

As an attempt for improving various properties required for automobile pneumatic tires, a method is also proposed in which a modified diene based polymer obtained by graft- or block-modifying a diene based polymer with a specific compound is added to a rubber composition for tires.

Patent Document 2 proposes that a diene based polymer obtained by block- or graft-copolymerizing polyethylene glycol diglycidyl ether to a diene based elastomer as a functionalizing agent is added to a diene based polymer in order to allow interactions with a reinforcing filler, for example, silica, carbon black and the like. A reinforced rubber composition obtained in this way shows improved hysteresis characteristics in a vulcanized state when the vulcanization is performed for tires, specifically treads for tires, by the reinforced rubber composition, and maintains satisfactory processing characteristics in a non-crosslinked state.

PRIOR ART DOCUMENT

Patent Document

Patent Document 1: JP 2002-88193 A
Patent Document 2: Japanese Unexamined Patent Application Publication No. 2010-531375

OUTLINE OF THE INVENTION

Problem to be Solved by the Invention

An object of the present invention is to provide a modified diene based polymer capable of improving the dispersibility of silica added for the purpose of simultaneously achieving a reduction of rolling resistance and a stability on wet road surfaces as one of various properties required for automobile pneumatic tires.

Means for Solving the Problem

The above object of the present invention can be achieved by a modified diene based polymer in which a diene based polymer is graft-modified with a polyether having a mercapto group attached via diurethane bonding.

Effect of the Invention

By adding the modified diene based polymer according to the present invention to a silica-containing rubber composition for automobile pneumatic tires, the dispersibility of silica compounded in the rubber composition can be improved, and a property inherent in silica which simultaneously allows a reduction of rolling resistance and a stability on wet road surfaces can be sufficiently effected.

EMBODIMENTS FOR CARRYING OUT THE INVENTION

In a polyether having a mercapto group attached for use in graft modification, the mercapto group is attached via diurethane bonding. Formation of diurethane bonding is performed by allowing sequential reactions of two species of hydroxyl group-containing compounds with an diisocyanate compound.

A first hydroxyl group-containing compound to react with an diisocyanate compound is a polyalkylene oxide having an inert substituent at one end. For the polyalkylene oxide, used is a homopolymer of an aliphatic or alicyclic alkylene oxide having 2 or more, preferably 2 to 8 carbon atoms, for example, ethylene oxide, propylene oxide, butylene glycol, hexylene glycol, tetrahydrofuran and the like, or a random or block copolymer thereof, preferably polyethylene oxide. As for these polyalkylene oxides, alkylene oxides having a degree of polymerization of 2 to 1,000 are preferably used.

One end of the polyalkylene oxide is substituted with an inert substituent, and the other end is a free hydroxyl group. The inert substituent is used in a form where a substituent not involved in an urethanization reaction with a diisocyanate compound, for example, a hydrogen atom of a hydroxyl group is substituted with an alkyl group having 1 to 10 carbon atoms such as a methyl group and an ethyl group, an aryl group such as a phenyl group, an aralkyl group such a benzyl group.

The hydroxyl group in the other end of the polyalkylene oxide having an inert substituent at one end is allowed to react with diisocyanate stoichiometrically at an equivalent ratio of OH group/NCO group of 1, but in practice, an equivalent ratio of 1 to 5 is applied.

Diisocyanate compounds include diisocyanates used for common polyurethane forming reactions, for example, aromatic isocyanates such as toluenediisocyanate [TDI], 4,4'-diphenylmethane diisocyanate [MDI], tolidine diisocyanate [TODI], p-phenylenediisocyanate [PPDI] and naphthalenediisocyanate [NDI], aliphatic isocyanates such as hexamethylene diisocyanate [HDI] and alicyclic isocyanates such as isophoronediisocyanate [IPDI] and hydrogenated MDI $[H_{12}MDI]$.

A terminal hydroxyl group of a polyalkylene oxide is allowed to react with a diisocyanate compound using an reaction solvent such as ethyl acetate, diethyl ether, toluene, methyl ethyl ketone, etc., at a temperature between about 0 and 100° C. in the presence of a catalyst generally used for an urethanization reaction, for example, a tertiary amine compound such as triethylamine, dioctyl tin dilaurate and lead octanoate.

In a case where diisocyanate groups of a diisocyanate compound to react with a terminal hydroxyl group are present in an unsymmetrical structure, an urethanization reaction occurs with a monoisocyanate group having larger reactivity while the other monoisocyanate group which has not been involved in the reaction is used for an urethanization reaction with a second hydroxyl group-containing compound.

For such a second hydroxyl group-containing compound, dihydroxyalkyl disulfide containing an alkyl group having 2 to 10 carbon atoms, preferably 2,2'-hydroxyethyl disulfide and the like are used. In this case, an equivalent ratio of OH group/NCO group is stoichiometrically 1, but in practice, an equivalent ratio of 0.5 to 5 is applied since two hydroxyl groups of dihydroxyalkyl disulfide undergo urethanization reactions with a polyalkylene oxide to which the first urethanization reaction has been performed. Note that a corresponding tetrasulfide compound, for example, 2,2'-dihydroxyethyl tetrasulfide and the like may be used instead of dihydroxyalkyl disulfide.

A reaction of a polyalkylene oxide having an inert substituent at one end, which is a first hydroxyl group-containing compound, with a diisocyanate compound, and a reaction of a dihydroxyalkyl disulfide and the like, which is a second hydroxyl group-containing compound, with the diisocyanate compound are both urethanization reactions, and their reaction conditions are the same. Therefore, after the first urethanization reaction is completed, the second hydroxyl group-containing compound is added to the reaction mixture to perform a second urethanization reaction.

A disulfide group-containing product resulted from these series of reactions is soluble in ethyl acetate and the like used as a reaction solvent, and also soluble in tetrahydrofuran and the like, but inactive in n-hexane and the like. Therefore, the product may be obtained as an n-hexane-insoluble component.

The resulting disulfide group-containing compound is allowed to react with trioctylphosphine and the like in a reaction solvent such as tetrahydrofuran, thereby cleaving the disulfide bond to generate mercapto groups. The mercapto groups generated are functional groups capable of reacting with an adding double bond portion of a diene based polymer, and such a terminal mercapto group-containing product may be obtained as a n-hexane insoluble component because it is inactive in n-hexane and the like.

The terminal mercapto group-containing product is graft copolymerized to a diene based polymer by addition to a solution of the diene based polymer in toluene solvent, etc., and heating at about 60 to 150° C. for about 1 to 48 hours. Depending on the polymer type, the resulting graft modified diene based polymer may be obtained, for example, as a solid insoluble in an n-hexane/acetone (the volume ratio 1:1) mixed solvent because it is inactive in such a mixed solvent.

Diene based polymers are in general elastomeric, and include, for example, natural rubber, isoprene rubber, butadiene rubber, 1,2-polybutadiene, chloroprene rubber, butyl rubber, styrene-butadiene rubber, nitrile rubber or EPDM. Styrene-butadiene rubber [SBR] or butadiene rubber [BR] is preferably used.

This modified diene based polymer is used as a component of a silica-containing rubber composition for automobile pneumatic tires as an active ingredient for improving the dispersibility of silica added to the tire rubber composition in order to allow simultaneous achievement of a reduction of rolling resistance and a stability on wet road surfaces required for automobile pneumatic tires. A typical addition ratio thereof is about 0.1 to 100 parts by weight per 100 parts by weight of a diene based polymer, preferably about 1 to 50 parts by weight.

EXAMPLES

Below, the present invention will be described with reference to Examples.

Reference Example 1

| (1) To a mixed solution of | |
|---|---|
| a polyethylene oxide having an OMe group at one end (NOF Corporation, Uniox M-400; MW: 400, n: 7.4) | 20.08 g |
| isophoronediisocyanate [IPDI] (the OH/NCO equivalent ratio: 1) | 11.16 g |
| ethyl acetate added was | 45 ml |
| dioctyl tin dilaurate and the mixture was stirred for 6 hours under the condition of room temperature. Subsequently, | 0.05 g |
| 2,2'-dihydroxyethyl disulfide (the OH/NCO equivalent ratio: 1) was added to the above mixture, and the resultant was stirred for 6 hours at 40° C. | 3.87 g |

The reaction mixture was added dropwise to 500 ml of n-hexane, and an n-hexane insoluble component and a n-hexane soluble component were separated to obtain 33.38 g of clear viscous liquid as an n-hexane insoluble component. NMR analysis demonstrated that a disulfide group-containing product I (n: 7.4) was produced. Note that it appears that $CH_2NCO$ of IPDI reacts in the first reaction, and annular C—NCO of IPDI reacts in the second reaction.

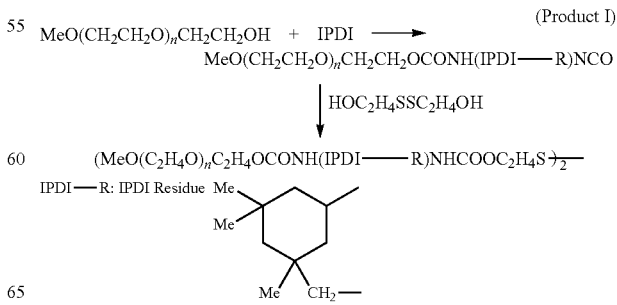

(Product I)

MeO(CH$_2$CH$_2$O)$_n$CH$_2$CH$_2$OH + IPDI ⟶
  MeO(CH$_2$CH$_2$O)$_n$CH$_2$CH$_2$OCONH(IPDI——R)NCO
  ↓ HOC$_2$H$_4$SSC$_2$H$_4$OH
  (MeO(C$_2$H$_4$O)$_n$C$_2$H$_4$OCONH(IPDI——R)NHCOOC$_2$H$_4$S)$_2$—
IPDI——R: IPDI Residue $^1$H-NMR (CDCl$_3$, 20° C.)
 δ=5.2 to 4.7 (br)
   4.4 (m)
   4.2 (m)
   3.7 (s)
   3.4 (s)
   2.9 (m)
   1.6 to 0.8(br)

(2) In 35 ml of tetrahydrofuran, dissolved was 31.59 g of the above product I (n: 4.7), and 14.17 g of trioctyl phosphine was added to this tetrahydrofuran solution, and the mixture was stirred for 48 hours under the condition of room temperature. The reaction mixture was added dropwise to 500 ml of n-hexane, and an n-hexane insoluble component and a n-hexane soluble component were separated to obtain 28.56 g of slightly yellowish viscous liquid. NMR analysis demonstrated that a terminal mercapto group-containing product II (n: 7.4) was produced.

Product I+P(OC$_8$H$_{17}$)$_3$→MeO(C$_2$H$_4$O)$_n$
   C$_2$H$_4$OCONH(IPDI-R)NHCOOC$_2$H$_4$SH    [Product II]

$^1$H-NMR (CDCl$_3$, 20° C.)
 δ=5.2 to 4.7 (br)
   4.3 (m)
   3.7 (s)
   3.4 (s)
   2.8 (m)
   1.6 to 0.8 (br)

Reference Example 2

(1) To a mixed solution of

| | |
|---|---|
| a polyethylene oxide having an OMe group at one end (NOF Corporation, Uniox M-100; MW: 1000, n: 21) | 25.29 g |
| isophoronediisocyanate [IPDI] (the OH/NCO equivalent ratio: 1) | 5.62 g |
| ethyl acetate added was | 50 ml |
| dioctyl tin dilaurate and the mixture was stirred for 6 hours under the condition of room temperature. Subsequently, | 0.05 g |
| 2,2'-dihydroxyethyl disulfide (the OH/NCO equivalent ratio: 1) was added to the above mixture, and the resultant was stirred for 6 hours at 40° C. | 1.96 g |

Then treatment was performed as in Reference Example 1 (1) to obtain 30.89 g of clear viscous liquid. NMR analysis (δ values were the same as those in Reference Example 1 (1)) confirmed that a disulfide group-containing product III (n: 21) was produced.

(2) In Reference Example 1 (2), 29.02 g of the Product III (n: 21) was used, and the amount of trioctylphosphine was changed to 6.50 g to obtain 27.86 g of slightly yellowish viscous liquid. NMR analysis (δ values were the same as those in Reference Example 1 (2)) confirmed that a terminal mercapto group-containing product IV (n: 21) was produced.

Example 1

To a toluene solution in which 1.15 g of SBR (Zeon Corporation, A1326) was dissolved in 15 ml of toluene, 2.74 g of the terminal mercapto group-containing product II (n: 7.4) obtained in Reference Example 1 (2) added was, and the mixture was stirred at 120° C. for 24 hours. After cooling, the reaction mixture was added dropwise to 300 ml of an n-hexane/acetone (the volume ratio 1:1) mixed solvent, and a mixed solvent insoluble component and a mixed solvent soluble component were separated.

The mixed solvent insoluble component was re-dissolved in 30 ml of toluene, and purified by the reprecipitation method using 500 ml of the same mixed solvent described above to obtain 2.01 g of a slightly yellowish white solid. NMR analysis demonstrated that it was a SBR that was graft modified with the mercapto group-containing product II (n: 7.4).

Product II+SBR→MeO(C$_2$H$_4$O)$_n$C$_2$H$_4$OCONH
   (IPDI-R)NHCOOC$_2$H$_4$S-(SBR-R) SBR-R:SBR
   Residue $^1$H-NMR (CDCl$_3$, 20° C.)
 δ=7.2 to 7.0 (br)
   5.7 to 5.1 (br)
   5.0 to 4.7 (br)
   3.7 (m)
   3.4 (m)
   2.6 (br)
   2.4 to 0.8 (br)

Example 2

In Example 1, the amount of SBR was changed to 1.24 g, and 5.41 g of the terminal mercapto group-containing product IV (n: 21) was used to obtain 3.68 g of a white solid. NMR analysis demonstrated that it was a SBR that was graft modified with the mercapto group-containing product IV (n: 21).

$^1$H-NMR (CDCl$_3$, 20° C.)
 δ=7.2 to 7.0 (br)
   5.7 to 5.1 (br)
   5.0 to 4.7 (br)
   3.7 (m)
   3.4 (m)
   2.6 (br)
   2.6 to 0.8 (br)

Example 3

To a toluene solution in which 2.62 g of BR (Zeon Corporation, A1220) was dissolved in 30 ml of toluene, 15.01 g of the terminal mercapto group-containing product II (n: 7.4) obtained in Reference Example 1 (2) added was, and then the mixture was treated as in Example 1 (except that the amount of toluene for dissolving an insoluble component was changed to 40 ml) to obtain 7.05 g of a brown solid. NMR analysis demonstrated that it is a BR that was graft modified with the mercapto group-containing product II (n: 7.4).

$^1$H-NMR (CDCl$_3$, 20° C.)
 δ=5.7 to 5.3 (br)
   7.2 to 6.9 (br)
   5.0 to 4.9 (br)
   4.4 to 4.2 (br)
   3.7 (s)
   3.4 (s)
   2.7 (br)
   2.3 to 2.0 (br)
   1.6 to 0.8 (br)

Example 4

In Example 3, the amount of BR was changed to 1.52 g, and 12.22 g of the terminal mercapto group-containing product IV (n: 21) was used to obtain 6.46 g of a dark brown solid. NMR analysis demonstrated that it was a BR that was graft modified with the mercapto group-containing product IV (n: 21).

$^1$H-NMR (CDCl$_3$, 20° C.)
δ=5.7 to 5.3 (br)
5.9 to 4.9 (br)
4.4 to 4.2 (br)
3.7 (s)
3.4 (s)
2.7 (br)
2.3 to 2.0 (br)
1.6 to 0.8 (br)

Reference Example 3

| | |
|---|---|
| SBR (Zeon Corporation, NS616) | 25.00 parts by mass |
| SBR (Asahi Kasei Corporation, E581) (18.75 parts by mass of oil added to 50 parts by mass of SBR) | 68.75 parts by mass |
| BR (Zeon Corporation, BR1220) | 25.00 parts by mass |
| Silica (Rhodia operations, Zeosil Premium 200MP) | 80.00 parts by mass |
| Carbon black (Tokai Carbon Co., Ltd., Seast KHP) | 4.00 parts by mass |
| Stearic acid (NOF Corporation, YR) | 2.00 parts by mass |
| Fatty acid ester (Schill & Seilacher, HT207) | 4.00 parts by mass |
| Anti-aging agent DPPD (Solutia Europe, 6 ppd) | 2.40 parts by mass |
| Paraffin A (Ouchi Shinko Chemical Industrial Co., Ltd., Sunnoc) | 1.00 parts by mass |
| Paraffin B (Nippon Seiro, Ozoace-0038) | 0.65 parts by mass |
| Coupling agent (Evonik Degussa, Si69) | 7.20 parts by mass |
| Process oil (Showa Shell Sekiyu K.K., Extra No. 4S) | 16.25 parts by mass |
| Zinc oxide (Seido Chemical Industry Co., Ltd., Zinc oxide Grade 3) | 3.00 parts by mass |
| Vulcanization accelerator A (Sumitomo Chemical Co., Ltd. Soxinol D-G) | 1.50 parts by mass |
| Vulcanization accelerator B (Ouchi Shinko Chemical Industrial Co., Ltd., Nocceler CZ-G) | 2.20 parts by mass |
| Sulfur (Karuizawa Smelter Co., Ltd., oil treated sulfur) | 1.30 parts by mass |

All components except for the vulcanization accelerators and sulfur among the components listed above were kneaded for 5 minutes with a 1.7 L closed Banbury mixer. After dumping the kneaded material out of the mixer and cooling to room temperature, the vulcanization accelerators and sulfur were mixed with the same Banbury mixer. The resulting unvulcanized rubber composition was press-vulcanized for 30 minutes at 150° C. to obtain a vulcanized rubber.

For the unvulcanized rubber composition and the vulcanized rubber, each of following items was determined.

Mooney viscosity (100° C.): In accordance with JIS K 6300-1:2001 which corresponds to ISO 289-1
Expressed in an index where this Mooney viscosity corresponds to 100
A smaller index indicates smaller viscosity.

Mooney scorch (T5): In accordance with JIS K 6300-1: 2001 which corresponds to ISO 289-1
Expressed in an index where the scorch time T5 corresponds to 100
A smaller value of the index indicates that scorching undergoes more rapidly Hardness (20° C.): In accordance with JIS K 6253:2006 which corresponds to ISO 48
Expressed in an index where this hardness (20° C.) corresponds to 100
A larger value of the index indicates higher hardness and good steering stability tan δ (0° C.), tan δ (60° C.): A predetermined test piece is cut out from the vulcanized rubber, and measured using a Iwamoto Seisakusyo spectrometer under the following conditions:
A distortion factor for extension and deformation of 10±2%, a frequency of 20 Hz, temperatures of 0° C. and 60° C.
Expressed in an index where each of tanδ thereof corresponds to 100
A smaller value of the index means smaller tan δ, indicating high wet performance (0° C.) and high dry performance (60° C.)

Example 5

In Reference Example 3, the same amount (25.00 parts by mass) of the graft modified SBR obtained in Example 1 was used instead of SBR (NS616).

Example 6

In Reference Example 3, the same amount (25.00 parts by mass) of the graft modified BR obtained in Example 3 was used instead of BR.

Comparative Example

In Reference Example 3, 5.00 parts by mass of the SH terminal modified PEG [Product II] obtained in Reference Example 1 was used in addition to the same amount of SBR and BR, respectively.

Measurement results from the above Examples 5 to 6 and Comparative Example are shown in the Table below.

TABLE

| Measurement item | Reference Example 3 | Example 5 | Example 6 | Comparative Example |
|---|---|---|---|---|
| Mooney viscosity (100° C.) | 100 | 88 | 80 | 90 |
| Mooney scorch (T5) | 100 | 95 | 105 | 60 |
| Hardness (20° C.) | 100 | 100 | 96 | 104 |
| tanδ | | | | |
| 0° C. | 100 | 98 | 105 | 91 |
| 60° C. | 100 | 107 | 105 | 105 |

The invention claimed is:

1. A rubber composition comprising one or more diene based polymers, silica and further comprising 0.1 to 100 parts by weight or a modified diene based polymer that improves the dispersibility of the silica in the one or more diene based polymers, wherein the modified diene based polymer comprises a main diene based polymer selected from butadiene rubber and styrene-butadiene rubber and a polyether, the polyether having a mercapto group attached thereto via a diurethane bond, wherein said polyether having the mercapto group attached thereto is grafted to the main diene based polymer selected from butadiene rubber and styrene-butadiene rubber, the amount of modified diene based polymer being 0.1 to 100 parts by weight based on 100 parts by weight of the one or more diene based polymers.

2. The rubber composition according to claim 1, wherein the polyether having a mercapto group is a polyalkylene oxide having an inert substituent at one end and a mercapto group attached at the other end via a diurethane bond.

3. The rubber composition according to claim 2, wherein the inert substituent at one end of the polyalkylene oxide is an alkyl group having 1 to 10 carbon atoms, an aryl group, or an aralkyl group.

4. The rubber composition according to claim 1, which is used to be added to a silica-containing rubber composition for automobile pneumatic tires.

\* \* \* \* \*